Jan. 9, 1962     M. T. HARVEY ETAL     3,016,092
COMPOSITIONS OF MATTER AND METHODS AND STEPS
OF MAKING AND USING THE SAME

Filed May 31, 1957                   2 Sheets-Sheet 1

Inventors
MORTIMER T. HARVEY
and PETER L. ROSAMILIA

By Angelo ....

Attorney

Jan. 9, 1962  M. T. HARVEY ETAL  3,016,092
COMPOSITIONS OF MATTER AND METHODS AND STEPS
OF MAKING AND USING THE SAME
Filed May 31, 1957  2 Sheets-Sheet 2

Inventors
MORTIMER T. HARVEY
and PETER L. ROSAMILIA

Attorney

United States Patent Office 3,016,092
Patented Jan. 9, 1962

3,016,092
COMPOSITIONS OF MATTER AND METHODS AND STEPS OF MAKING AND USING THE SAME
Mortimer T. Harvey, South Orange, and Peter L. Rosamilia, Newark, N.J., assignors to Harvel Research Corporation, Irvington, N.J., a corporation of New Jersey
Filed May 31, 1957, Ser. No. 662,830
20 Claims. (Cl. 166—31)

This invention relates to novel combinations, novel methods for preparing them and also to novel articles of manufacture which may be produced therewith. In one of its more specific aspects the invention is directed to novel methods for treating bore hole walls as well as other earth structures and to novel structures produced thereby.

One of the more specific aspects of the invention is directed to the art of sealing, plugging and/or consolidating earth such as rock, sand, soil or other type of earth formation, sometimes for the specific purpose of preventing or at least reducing the flow of liquid therethrough and to render them substantially impervious or at least less pervious to the flow of fluid therethrough. In one of its other more specific aspects the invention is directed to improved methods for plugging, sealing, grouting, impregnating or otherwise consolidating masses or bodies of sand, soil, rock or other earth formation which may be in a mineral formation or naturally occurring formation such as in the plugging or sealing of oil wells, gas wells, mines, shafts or other subsurface borings and tunnels.

In addition to the treatment of naturally occurring formations, the combinations of this invention are readily adaptable to a variety of other uses which will be hereinafter described and may be used with or without other components.

In one of its more specific aspects the practice of the present invention is particularly applicable in the oil well and gas well fields where the problem of stopping the flow of unwanted fluids can occur at various depths varying from short distances below the ground level to depths of 20,000 ft. or more. In this considerable range of depths, a corresponding range of temperatures also occurs, e.g., from atmospheric temperatures to 350° F. and higher. This range of temperature imposes a problem when it is desired to seal certain earth openings and also permeable strata at various distances from the earth surface with solidifiable materials whose rate of solidification is effected by the temperature encountered. The applicability of the methods and combinations of the present invention to the above stated problem will hereinafter appear in the following detailed description which is given merely by way of illustration and not by way of limitation.

In some cases the standard procedure for completing or sealing a well is to pump a Portland cement slurry down the inside of the steel pipe which serves as the well casing, around the bottom, and up the outside of the casing to serve as a filing between the outside of the casing and the wall of the bore hole. When the slurry reaches the desired height around the outside of the casing, the bottom becomes closed off and the cement at the bottom and around the outside of the casing is allowed to set to form a tubular inner lining between the bore hole wall and the steel casing and a plug at the bottom of the casing, leaving the rest of the casing free for use. If necessary, the cement plug at the bottom can be drilled to reach further depths or openings can be made through the sides of the casing and the cement inner lining by shooting operations well known and commonly used in oil field operations.

In some cases the steel casing is not centered in the bore hole but lies close to or even against one side of the bore hole wall so that the Portland cement is either thin or entirely absent at such points. In either case flow of unwanted fluids from one stratum to another higher or lower stratum which carries desired fluid such as oil or gas can occur and it then becomes necessary to block off the unwanted fluid. Sometimes this blocking off is done after the well is completed and setting material such as Portland cement is used, but due to the fact that a Portland cement or similar solid slurry will not permeate into rock or soil strata or for some other reason it has been found necessary to supplement the slurry with a water soluble resin which sets in place. The Portland cement serves as a filtering body by packing up against the bore hole wall and permitting the water of the slurry under the pressures used to pass through and into the bore hole wall carrying the water soluble resin with it as a squeeze-out. After a certain amount of the water soluble resin has been forced into the bore hole wall it is sealed off and left to stand under pressure until it sets in place.

Prior to the present invention, we proposed the use of certain compositions in the art of oil well sealing. Indeed, our proposal was accepted in the art and was directed to compositions (I) comprising water-soluble ketone-aldehyde reaction products, hydraulic cement and water for the aforesaid purposes. (By the term "water-soluble" as employed throughout the description and claims, we mean capable of forming solution with an equal volume of water.) This was a marked departure from the prior art practices and represented a very significant advance in the art for the reasons, among others, that the ketone-aldehyde reaction products are stable and consequently are substantially unaffected by the temperatures encountered under normal storage or transportation conditions and therefore no refrigeration is required at any time. Therefore, such reaction products are suitable for all practical handling and transportation conditions generally encountered no matter what the locale of use may be. Besides having the aforesaid very significant advantages, ketone-aldehyde reaction products also have the advantage of being so reasonably priced as to be economically feasible for use as a component of a hydraulic cement slurry which may be employed for the aforesaid purposes. In addition, such stable ketone-aldehyde reaction products themselves were found to be useful alone for sealing porous earth strata. It was found that they could be converted to the substantially solid and water resistant or insoluble state by the addition of an appropriate catalyst, such as lime. By the term "lime" as employed in the present description and claims, we mean calcium hydroxide usually found and sold on the market as hydrated lime or slaked lime.

Besides being stable, water soluble and economically sound, the ketone-aldehyde organic reaction products preferably employed have the following additional characteristic: when a 100-gram aqueous solution consisting of 80 grams of such ketone-aldehyde reaction product and 20 grams of water are mixed with 10 grams of lime and such mixture is placed in an oven maintained at 130° F. and allowed to remain therein for 24 hours, at the end of that period, the resultant mass will be found to be substantially mineral oil and water resistant and substantially solid at 70° F. and substantially infusible at 300° F.

Such compositions (I) containing hydraulic cement, water and such ketone-aldehyde reaction products are useful in the art of concrete, facing materials, plugging and sealing earth formations with or without the use of pressure and in some cases, where pressure is employed, the ketone-aldehyde reaction product component together with some of the water of such combination are forced or squeezed out of the admixture into such earth formation and thereafter the squeeze-out containing ketone-aldehyde reaction product became cured within the formation thereby forming a sheath around the cement which also was cured and contained some proportion of ketone-aldehyde reaction product originally present in the combination before application of pressure. Thus, in some instances, depending upon the pressure employed and the type of earth formation, two layers are formed, the outer layer being essentially the squeeze-out ketone-aldehyde-rich portion and the inner layer being a hydraulic cement-rich portion both of which become converted to the substantially solid and substantially water-insoluble state.

We also proposed the production and use of a solution or slurry, generally aqueous and alkaline for the aforesaid purposes of treating an earth bore hole wall to plug, seal or consolidate the earth formation of such a wall, and also proposed that instead of employing an aqueous alkaline slurry of such reaction products, that there be employed an aqueous alkaline slurry containing such ketone-aldehyde reaction product and one or a combination of two or more inorganic materials such as bentonite, barium, calcium or other alkaline clays, cementitious material, hydraulic cement, such as gypsum cement (plaster of Paris) and the like. Of these, the preferable hydraulic cements proposed for such slurries were one or a combination of two or more of the hydraulic cements, such as Portland cement and aluminous cements produced by the sintering of lime-alumina-silica systems and containing di- and tri-calcium silicates and mono- and tri-calcium aluminates. Said reaction products may be of various consistencies varying from thin liquids to very thick, heavy bodied masses at atmospheric pressure and room temperature (70° F.) and may be produced by reacting one or a combination of two or more ketones, with an aldehyde, and preferably formaldehyde, in the presence of a catalyst. Besides such reaction products, the term "ketone-aldehyde organic reaction product," as employed in the description and claims, is also meant to include a combination of a ketone-aldehyde reaction product together with another ketone-aldehyde reaction product, or a ketone-aldehyde reaction product reacted with another ketone.

Such ketone-aldehyde organic reaction product preferably employed in the production of compositions (I) are acetone-formaldehyde organic reaction products produced by reacting acetone and formaldehyde; or such acetone-formaldehyde reaction products in combination with one or more organic reaction products of formaldehyde and one or more other ketones; or (mixed ketones)-formaldehyde reaction products in which at least one of said ketones is acetone, produced by reacting formaldehyde with acetone and one or a combination of two or more other ketones. The other ketones preferably employed are those which have 3 hydrogen atoms on an alpha carbon, such as methyl ethyl ketone, methyl propyl ketone, diacetone alcohol, mesityl oxide, acetonyl acetone, ethyl ester of aceto acetic acid, etc. In this last reaction, we believe that there is produced a reaction mass containing a number of different reaction products, namely, acetone-formaldehyde, other ketone-formaldehyde and (acetone and other ketones)-formaldehyde reaction products; and that reaction masses containing such three reaction products may be produced by reacting a ketone-formaldehyde reaction product with another ketone or by reacting another ketone-aldehyde reaction product with acetone. By the term "formaldehyde," we mean to include formaldehyde as well as its equivalents, such as paraformaldehyde, trioxane, etc., as well as formaldehyde donors, such as hexamethylene tetramine, etc.

The employment of such ketone-aldehyde reaction product as a component in a combination containing hydraulic cement and water represents a marked departure from the prior art and especially in the art of treating earth bore hole walls. Such marked departure represented a very significant advance in the art for the reasons that such ketone-aldehyde reaction products are stable and are substantially unaffected by the temperatures encountered under normal storage and transportation conditions encountered in the field. In addition, such ketone-aldehyde reaction products have the advantage of being so reasonably priced as to be economically feasible for use in combination with water and hydraulic cement. Moreover, such ketone-aldehyde organic reaction products have the still further advantage that when a slurry containing hydraulic cement, water and such ketone-aldehyde organic reaction product is forced against an earth bore wall by pressure, there is some separation therefrom of a solution of said ketone-aldehyde reaction product which impregnates said wall and while maintained under pressure at the temperatures encountered, the ketone-aldehyde reaction product is converted to the substantially solid state and is in the nature of a gel and contains water.

In most cases, such preferred ketone-aldehyde reaction products which are preferably employed in the production of compositions (I) are those which are soluble in an equal volume of water, and especially those which at 70° F. exhibit flow and therefore are liquid and also are liquid at 130° F. When in an aqueous solution of 4 parts by weight of said reaction product to 1 part by weight of water, said solution will have a viscosity at 25° C. in the range of 200–50,000 centipoises. When a 100 gram sample of such aqueous solution of any of said reaction products are mixed with 10 grams of lime and allowed to remain for 24 hours in an oven whose temperature is 130° F., at the end of that period the resultant mass will be found to be in the substantially solid state at room temperature and will remain in that state at elevated temperature of at least 300° F. and is also substantially water-insoluble.

A solution or slurry, generally aqueous and alkaline, may be employed for the aforesaid purpose of treating an earth bore hole wall to plug, seal or consolidate the earth formation of such a wall.

Instead of employing a straight alkaline solution or slurry of such reaction products, it is preferred to employ an aqueous alkaline slurry of one or a combination of two or more inorganic materials such as bentonite, barium, calcium or other alkaline clays, cementitious material, hydraulic cement, such as gypsum cement (plaster of Paris) and the like. Of these, it is preferred to employ one or a combination of two or more of the hydraulic cements such as Portland cement and aluminous cements produced by the sintering of lime-alumina-silica systems and containing di- and tri-calcium silicates and mono- and tri-calcium aluminates.

The various acetone-formaldehyde reaction products may be produced by reacting acetone and formaldehyde under varying conditions. Generally they are produced by reacting a mixture of acetone and formaldehyde to which has been added an alkaline catalyst. The molecular proportions of the acetone and formaldehyde which are reacted in the mixture are preferably 1 mole of acetone to at least 2 and preferably 3–5 moles of formaldehyde and an example of the catalyst employed is sodium hydroxide or any of its equivalents such as potassium hydroxide, calcium hydroxide, potassium carbonate, sodium carbonate, etc. These strongly alkaline catalysts are of such a nature that when added to such mixtures of acetone and formaldehyde they are capable of providing an exothermic reaction between the acetone and formaldehyde after the reaction has been initiated with the aid of external heat.

By employing the procedure set forth in Examples A-D and controlling the quantity of alkaline catalyst or agent employed, there may be produced acetone-formaldehyde reaction products which are normally liquid, soluble in an equal volume of water, with high yields of such water soluble reaction products, said yields being at least 75% by weight of the combined weights of the acetone and formaldehyde in the original charge.

When the mole ratio of the acetone to the formaldehyde in the charge is one to three, the quantity by weight of sodium hydroxide employed is less than 4%, generally 1%–3% and preferably approximately 2% of the combined weights of acetone and formaldehyde in the charge; when the mole ratio of the acetone to the formaldehyde in the charge is one to four, the quantity by weight of sodium hydroxide employed is less than 5%, generally 1.5–4% and preferably approximately 2.5% of the combined weights of acetone and formaldehyde in said charge; when the mole ratio of acetone to formaldehyde in the charge is one to five, the quantity by weight of sodium hydroxide employed is less than 7.75%, generally 2–6% and preferably approximately 4% of the combined weights of acetone and formaldehyde in said charge. Of course, instead of employing sodium hydroxide, the alkaline equivalent of any other strongly alkaline reagent may be used.

The sodium hydroxide or other alkaline reagent is preferably first dissolved in a solvent such as water and the alkaline reagent is added to the charge as a solution. For best results, the solution of alkaline reagent should not be added all at one time. It may be added in increments the amounts of which are dictated or controlled by the speed of reaction desired. After the entire charge of acetone and formaldehyde is contained in the reaction vessel, the aqueous solution generally 50% concentration of the sodium hydroxide or other alkaline reagent is made up in a separate container, with the amount of reagent dependent upon the mole ratio of acetone to formaldehyde in the charge. The aqueous alkaline solution is divided into three or four equal parts. One part is then added to the acetone and formaldehyde charge which is constantly stirred throughout the entire process. After this addition the mass is externally heated to a temperature of about 120–130° F. to initiate the reaction. The heat is shut off and the mass now reacts exothermically and its temperature rises and by the use of cooling water in the jacket of the reaction vessel its temperature is allowed to rise to approximately 200° F. Then its temperature goes down to approximately 175° F. whereupon the second quarter of the alkaline solution is added. Again the temperature rises and is allowed to rise to approximately 200° F. and falls to approximately 175° F. The third quarter of the alkaline solution is added and again the temperature rises and is allowed to rise to approximately 200° F. and falls to approximately 175° F. The last quarter of the alkaline solution is added and again the temperature rises and is allowed to rise to approximately 200° F. and then falls to approximately 140° F. whereupon the cooling water is shut off. Then the mass may be maintained in the state of boiling under a reflux condenser for ½ hour to 1 hour, if desired, and then allowed to cool to approximately 140° F. Either with or without the boiling under reflux, vacuum is now gradually applied in the reaction vessel to remove some of the water, and to cause cooling of the mass until the temperature of the mass is lowered to approximately 105–110° F. At this stage a 28–29″ vacuum is applied and dehydration is continued until a solution of the desired percentage of solids is obtained or until the resin is substantially anhydrous. In either case the reaction product of a resinous nature produced is liquid, water soluble in an equal volume of water and thermosetting under alkaline conditions and measures at least 75% of the combined weights of the acetone and formaldehyde in the original charge. Said reaction product is also characterized by being stable for months at temperature of 30° C. Said reaction product besides having such good stability characteristics especially when dehydrated to an aqueous solution of 60–85% concentration also has the characteristics of having excellent pumping qualities in aqueous solution and also when in an aqueous slurry of hydraulic cement, has very high bonding strength when converted to the solid state, has good antifriable characteristics when converted to the solid state, has good squeezability characteristics when in an aqueous slurry of hydraulic cement whereby it may be squeezed out therefrom when subjected to pressure which may vary and be as high and run higher than 10,000 lbs. per square inch.

The following are examples of methods for producing acetone-formaldehyde reaction products which may be used in the production of compositions (I) and are given merely by way of illustration and not in a limiting sense.

EXAMPLE A (1 mole acetone-4 moles formaldehyde)

300 lbs. acetone
1700 lbs. aqueous solution formaldehyde (37% conc.)
25 lbs. NaOH in
60 lbs. water The caustic soda-water solution was divided into four equal parts. All of the acetone and formaldehyde were loaded into a jacketed reaction vessel provided with appropriate stirring equipment. With the stirring equipment in operation and with steam turned on through the jacket, the acetone and formaldehyde mixture was heated to a temperature of about 120–125° F. whereupon the steam was cut off and one portion of the caustic soda-water solution was added thereto. Upon the addition of the caustic soda solution to the mixture, the reaction is initiated and proceeds exothermically whereupon the temperature of the mass being agitated begins to rise and when it reaches approximately 130° F. the cold water is turned on and controlled so that the exothermic reaction proceeds and the temperature slowly rises to approximately 200° F., and then slowly begins to fall. When it falls to approximately 185° F., the second portion of the caustic soda water solution is added whereupon the temperature of the mass again rises and is controlled by the cooling water whereupon it is allowed to rise slowly again to approximately 200° F. Again the temperature begins to fall and when it reaches approximately 185° F. the procedure is repeated allowing the temperature slowly to rise and fall as before between the additions of the caustic soda-water solution and keeping the cold water on the jacket at all times. After the last addition of caustic soda-water solution whereupon the temperature of the mass was allowed to rise to approximately 200° F. and then begins to fall, and in this instance it is allowed to fall to approximately 140–150° F. at which stage the cold water is shut off. During this entire operation the vent at the top of the reacting vessel was maintained open and while still open the vacuum is turned on at this stage. The vent is now slowly closed, while vacuum is maintained and dehydration occurs at a very rapid rate, and temperature of the mass begins to drop. Steam is admitted to the jacket to allow dehydration to progress rapidly. In this manner vacuum is applied and maintained in the reaction vessel and dehydration proceeds and may be continued to provide the desired concentration of the acetone-formaldehyde reaction product therein. This dehydration may be continued until the concentration of the acetone-formaldehyde reaction product is 60–100% and preferably 60–85%. The amount of said reaction product produced according to this method measures more than 75% of the combined weights of the acetone and formaldehyde in the original charge. Said acetone-formaldehyde reaction product is of a resinous nature, is liquid, is hereinafter known as product A, is amber colored, and is soluble in an equal volume of water. An 80% aqueous solution of product A has a viscosity of 732.6 cp. at 25° C. and atmospheric pressure.

EXAMPLE B (1 mole acetone-3 moles formaldehyde)

30 parts of acetone
126 parts of aqueous solution of formaldehyde (37% conc.)
2 parts NaOH in
4 parts water Using the same procedure as that set forth in Example A, the resultant acetone-formaldehyde reaction product, hereinafter known as product B, was likewise amber-colored liquid and measured more than 75% of the combined weights of acetone and formaldehyde in the original charge. Product B was soluble in an equal volume of water.

EXAMPLE C (1 mole acetone-5 moles formaldehyde)

30 parts of acetone
212 parts of formaldehyde (aq. sol. 37% conc.)
4 parts of NaOH in
8 parts of water Employing the same procedure as that set forth in Example A, except that after the last addition of caustic soda-water solution and subsequent drop in temperature following the last exothermic reaction, the entire mass is heated to boiling under a reflux condenser for approximately 15 minutes. The quantity of free formaldehyde in the mass is determined and found to be 5.2% of the amount of formaldehyde in the original charge. Upon dehydration at 210° F. in the manner heretofore indicated, the resultant substantially anhydrous resin known as product C was an amber colored, viscous mass, infinitely soluble in water and measuring more than 75% of the combined weight of acetone and formaldehyde in the original charge.

EXAMPLE D (1 mole acetone-4.5 moles formaldehyde)

165 lbs. acetone
1050 lbs. aqueous solution of formaldehyde (37% conc.)
13.5 lbs. NaOH in
27.5 lbs. water Employing the same procedure as that set forth in Example A, there is produced an 80% aqueous solution of product D which is essentially an acetone-formaldehyde reaction product of a resinous nature, normally liquid, of amber color and soluble in an equal volume of water. Such 80% aqueous solution of product D is stable for 6 months at 30° C.

EXAMPLE E

If desired, the acetone-formaldehyde reaction products such as products A, B, C and D may be treated or polymerized to increase its viscosity by merely heating or to increase its viscosity and to decrease the content of free formaldehyde present. For this latter purpose in Examples A–D, the dehydration step is terminated when the acetone-formaldehyde organic reaction product in aqueous solution measures about 65–85%. Then said aqueous solution of said partially dehydrated acetone-formaldehyde reaction product is placed in a reacting vessel and there is added thereto an aqueous solution of an alkali and preferably a mild alkali such as sodium sulphite, sodium acetate, potassium sulphite or equivalent compound to increase the pH of the mix. The mix is heated slowly to a temperature of about 250° F. and is maintained until the viscosity of 4 parts of the resin therein when dissolved in one part of water measures 2,000–50,000 cp. at 25° C. This provides a simple, easily controllable method which is eminently suitable in factory practice for thickening or increasing the viscosity of the acetone-formaldehyde resin to the desired degree, and practically eliminating the danger of the resin going to the infusible state. More specifically, for example, 250 lbs. of an 80% solution of said acetone-formaldehyde resin, after the partial dehydration step, is now mixed with an aqueous solution consisting of approximately 7 lbs. of sodium sulphite dissolved in a small amount of water. The mixture is heated to approximately 250° F. and maintained at that temperature until a sample of 4 parts of the resin when dissolved in one part of water is in the aforementioned viscosity range. When this viscosity is reached, the heat is cut off and enough water is added to the resin to provide a solution which measures 4 parts of resin to each part of water present. This batch which is an aqueous solution of said resin will be within the viscosity range heretofore set forth. Such acetone-formaldehyde organic reaction products so produced from products A, B, C and D are hereinafter respectively known as products E, F, G and H and all of them are capable of flow at 130° F. and are soluble in water.

An organic catalyst, such as an amine, may be employed with or without the aid of an inorganic catalyst as shown by the following illustrative examples. Throughout this entire description and claims all parts are by weight unless otherwise specified.

EXAMPLE I 1700 parts of aqueous solution of formaldehyde (37%)
600 parts of acetone
25 parts of triethylamine All of said components are mixed together and warmed gently to accelerate the exothermic reaction which ensues and is allowed to continue under a reflux condenser after the external source of heat has been removed. When exothermic reaction subsides, external heat is again applied to maintain the mass in the state of boiling under the condenser for ½ hour. The condenser is then removed and the mass is heated to about 130° C. to dehydrate. The resultant substantially anhydrous acetone-formaldehyde liquid reaction product is of a resinous nature, is straw colored and is hereinafter known as product I and measured about 950 parts containing 0.75% nitrogen.

EXAMPLE J

Employing the same components in the respective amounts set forth in Example I and employing the procedure as therein set forth except that the acid number of the formaldehyde solution has first been ascertained and then sufficient sodium carbonate is added thereto to reduce the acid number thereof to zero. The resultant substantially anhydrous acetone-formaldehyde liquid reaction product is of a resinous nature, is straw colored and is hereinafter known as product J and measured about 950 parts.

EXAMPLE K

To 1700 parts of aqueous solution of formaldehyde (37%) is added a solution of 315 parts of acetone together with 25 parts of triethylamine. Under reflux condenser the mass is warmed gently to accelerate the exothermic reaction. After the exothermic reaction has subsided, a solution of 315 parts of acetone together with 25 parts of triethylamine is added thereto. By the use of external heat the mass is maintained in the state of boiling under said condenser for 30 minutes. Then the mass is heated to about 130° C. to substantially completely dehydrate it. The yield is 973 parts of substantially anhydrous liquid acetone-formaldehyde reaction product which is of a resinous nature, straw colored and is hereinafter known as product K.

EXAMPLE L 510 parts of aqueous solution formaldehyde (37% conc.)
360 parts of acetone
75 parts of diethylamine propyl amine The above components were mixed and placed under a reflux condenser and allowed to stand at room temperature (70° F.) whereupon an exothermic reaction occurred and the temperature of the mass reached 76° C. The mass was allowed to react for about 1½ hours, the condenser removed and then the mass was maintained, under reduced pressure of 70 mm. of mercury pressure, at a temperature of 95° C. until it was substantially completely dehydrated. This yielded 342 parts of substantially anhydrous liquid acetone-formaldehyde reaction product which was of a resinous nature, was straw colored and is hereinafter known as product L.

EXAMPLE M 510 parts of aqueous solution formaldehyde (37%)
180 parts of acetone
75 parts of diethylamino propylamine Employing the same procedure as set forth in Example L, there was obtained a yield of 325 parts of substantially anhydrous liquid acetone-formaldehyde reaction product which is of a resinous nature, is straw colored and is hereinafter known as product M.

EXAMPLE N 170 parts of aqueous solution of formaldehyde (37%)
60 parts of acetone
0.5 part of diethyl amino propyl amine The above components were mixed and placed under a reflux condenser. The pH of the mix was determined and found to be about 9. The mix was heated gently to accelerate the speed of the exothermic reaction. When the exothermic reaction had subsided, the mass was maintained in the state of boiling for ½ hour. Then the condenser was removed and the mass dehydrated under vacuum about 70 mm. of mercury presure and a temperature of about 90–95° C. to obtain a liquid substantially anhydrous acetone-formaldehyde reaction product which was of a resinous nature and straw colored and is hereinafter known as product N.

EXAMPLES O–Q

Using the same first two components of Example N in the same amounts as therein set forth and also the third component, except that the third component is present in the following respective amounts: 1 part in one case, 6 parts in another and 26 parts in the third and using the method set forth in Example N, there were obtained liquid substantially anhydrous acetone-formaldehyde reaction products all of which were of a resinous nature, straw colored and are hereinafter respectively known as products O, P and Q. The pH of products O, P and Q were determined and found to be respectively 8.5, 9.5 and 10.5. Such determinations were made on aqueous solutions of said respective products dissolved in 4 times their weight of water.

Employing the particular three components of Examples 1–6 herebelow, in each instance such respective three component mixtures were gently heated and continuously stirred whereupon reaction between the ketone and aldehyde was initiated and continued only so long as the resultant reaction product is water soluble and is terminated at the first observation of any cloudiness. Said entire masses are respectively charged into equal volumes of 80% aqueous solutions of product I, to provide products R, S, T, U, V, and W.

EXAMPLE 1

255 parts of aqueous solution of formaldehyde (37%)
110 parts of diacetone alcohol
5 parts of diethyl amine propyl amine

EXAMPLE 2

170 parts of aqueous solution of formaldehyde (37%)
60 parts of mesityl oxide
5 parts of diethylamine propyl amine

EXAMPLE 3

340 parts of aqueous solution of formaldehyde (37%)
72 parts of methyl ethyl ketone
35 parts of diethylamine propyl amine

EXAMPLE 4

170 parts of aqueous solution of formaldehyde (37%)
60 parts of acetonyl acetone
26 parts of diethylamine propyl amine

EXAMPLE 5

255 parts of aqueous solution of formaldehyde (37%)
130 parts of ethyl ester of aceto acetic acid
25 parts of diethyl amino propyl amine

EXAMPLE 6

170 parts of aqueous solution of formaldehyde (37%)
60 parts of isophorone
25 parts of diethyl amino propyl amine

EXAMPLE X 170 parts of aqueous solution of formaldehyde (37%)
60 parts of acetone
1 part of triethylamine The components are charged into a stainless steel autoclave and heated to raise the pressure therein to 100 lbs. per sq. in. and the mass was so maintained for 1 hour. The source of heat was removed and then the mass was dehydrated at 95° C. under 40 mm. of mercury pressure to obtain a yield of 82 parts of anhydrous liquid acetone-formaldehyde reaction product of a resinous nature, which is stable and water soluble and is known hereinafter as product X.

Instead of using a closed vessel, such as the autoclave, the reaction may be carried out at atmospheric pressure under a reflux condenser and maintained in the state of boiling for about ½ hour and the substantially anhydrous reaction product obtained is liquid, water soluble and resinous and measures 95 parts and is hereinafter known as product Y.

All of said ketone-formaldehyde reaction products, in which amine is the catalyst employed, are alkaline, that is, the pH of the water solution thereof is at least 7.2. A sample of reaction product I, for example, is strongly alkaline and has been stable for more than 2 months.

EXAMPLE Z 170 parts of aqueous solution of formaldehyde (37%)
30 parts of acetone
25 parts of triethylamine Employing the same procedure as that set forth in Example I there is obtained a substantially anhydrous acetone-formaldehyde liquid reaction product which was of a resinous nature and is hereinafter known as product Z and measured about 95 parts.

EXAMPLE AA 85 parts of aqueous solution of formaldehyde (37%)
30 parts of paraformaldehyde
60 parts of acetone
25 parts of triethylamine The four components are mixed together under a reflux condenser and warmed gently to increase the speed of the exothermic reaction which proceeds and the temperature of the mass goes to about 165° F. After it has subsided, the mass is maintained in the state of boiling under the reflux condenser for about 1 hour. Remove condenser and the mass is heated to about 130° C. to dehydrate and the resultant product is a substantially anhydrous liquid reaction product, hereinafter known as product AA and weighing about 85 parts.

EXAMPLE BB 60 parts of acetone
340 parts of aqueous solution of formaldehyde (37%)
1.2 parts of potassium carbonate dissolved in
2.5 parts of water were charged into a reacting unit having a reflux condenser and mixed together. External heat was applied until the temperature of the mass reached 145° F. External heat was removed because the exothermic reaction started and continued. The temperature rose to 165° F. The reaction was allowed to continue for 15 minutes and the temperature began to drop. The mass was cooled to about 140° F. and at this stage 60 parts of acetone and 5 parts of triethyl amine are added. Heat was applied to maintain the mass in the state of boiling under the condenser for ½ hour. The condenser was removed and the mass maintained at 225° F. to partially dehydrate and provide an 80% aqueous solution of the acetone-formaldehyde reaction product hereinafter known as product BB. The viscosity of said solution at 25° C. was 2440 cp., the specific gravity 1.205 at 25° C. and the index of refraction 1.4857 at 25° C.

EXAMPLE CC 140 parts of aqueous solution of formaldehyde (37%)
60 parts of acetone
2 parts of diethyl amino propyl amine were charged into a reacting vessel having a reflux condenser. The mass was stirred and external heat applied to hasten the exothermic reaction. The temperature rose to 175° F. and remained at that temperature for about 15 minutes. Then the mass was cooled to 140° F. and 60 parts of acetone and 12 parts of diethyl amino propyl amine were added. Again an exothermic reaction set in and the temperature rose to 165° F. At this stage, external heat was applied and the mass was maintained in the state of boiling for ½ hour. The condenser was removed and the mass was maintained at 225° F. to dehydrate to provide an 80% aqueous solution of resinous acetone-formaldehyde reaction product known hereinafter as product CC which solution at 25° C. had the following characteristics: viscosity, 1670 cp.; specific gravity, 1.215; and index of refraction, 1.4818.

EXAMPLE DD 1700 parts of aqueous solution of formaldehyde (37%)
315 parts of acetone were mixed together and then there were added thereto:

12.5 parts of triethylamine

The reaction was allowed to take place and cooling provided so that the exothermic reaction is not too vigorous. When the exothermic reaction had subsided, a charge of 315 parts of acetone
12.5 parts of triethylamine was added to said mass with stirring and a second exothermic reaction was allowed to take place. Then after this reaction had subsided the mass was refluxed for 1½ hours, then dehydated at elevated temperature to provide product DD.

EXAMPLE EE 170 parts of aqueous solution of formaldehyde (37%)
60 parts of acetone
3 parts of diethyl amino propyl amine Employing the same procedure as that set forth in Example N, there was provided substantially anhydrous acetone-formaldehyde reaction product hereinafter known as product EE.

EXAMPLE FF 170 parts of aqueous solution of formaldehyde (37%)
60 parts of acetone
7.5 parts of diethyl amino propyl amine Employing the same procedure as that set forth in Example N, there was provided substantially anhydrous acetone-formaldehyde reaction product hereinafter known as product FF.

Employing the same procedure as that set forth in Example A, except that instead of acetone being the only ketone employed, a mixture of acetone and one or more other ketones are used, and the components are used in the following proportions:

EXAMPLE GG 50 parts of acetone
25 parts of methyl ethyl ketone
425 parts of aqueous solution of formaldehyde (37%)
6 parts of NaOH in
12 parts of water providing a solution consisting of 80 parts of resinous reaction product, hereinafter known as product GG, in 20 parts of water.

EXAMPLE HH 37.5 parts of acetone
37.5 parts of methyl ethyl ketone
425 parts of aqueous formaldehyde (37% conc.)
6 parts of NaOH in
12 parts of water to provide a solution consisting of 80 parts of resinous reaction product, hereinafter known as product HH, in 20 parts of water.

EXAMPLE II 25 parts of acetone
50 parts of methyl ethyl ketone
425 parts of aqueous formaldehyde (37% conc.)
6 parts of NaOH in
12 parts of water to provide a solution consisting of 80 parts of resinous reaction product, hereinafter known as product II, in 20 parts of water.

EXAMPLE JJ 65 parts of acetone
10 parts of methyl ethyl ketone
425 parts of aqueous formaldehyde (37% conc.)
6 parts of NaOH in
12 parts of water to provide a solution consisting of 80 parts of resinous reaction product, hereinafter known as product JJ, in 20 parts of water.

All of said ketone-aldehyde reaction products, specific illustrative examples of which are products A-JJ respectively, are water soluble and are further characterized as follows: When a 100-gram solution consisting of 80 gram sample thereof in 20 grams of water is mixed with 10 grams of lime and the mixture is placed in an oven at 130° F. and allowed to remain therein for 24 hours at the end of that period the mass will be substantially solid resinous product infusible at 300° F. and is substantially water-insoluble.

It is well known that the temperature of the various strata of bore hole walls of oil and gas wells vary considerably depending upon the particular distance each is located from the surface of the earth and that the further from such surface, the greater is the temperature thereof. Because the earth formations to be consolidated or sealed are located at various distances from the earth surface and therefore are at different temperatures, both of these factors, namely, distance and temperature must be considered. According to this invention, there is provided a novel means for controlling the pumping time of compositions (I) and at the same time providing novel combinations with compositions (I), which combinations are superior to compositions (I) themselves, and which combinations, when under pressure, are capable of providing squeeze-outs which are superior to squeeze-outs of compositions (I). We have discovered that by adding certain hardening or modifying agents to compositions (I), we may control the pumping time of and also impart to such compositions (I) and squeeze-outs thereof, novel unexpected and improved characteristics.

For a fuller understanding of the nature and objects of this invention, reference should be had to the following detailed description taken in connection with the accompanying drawings, in which.

Figure 1:
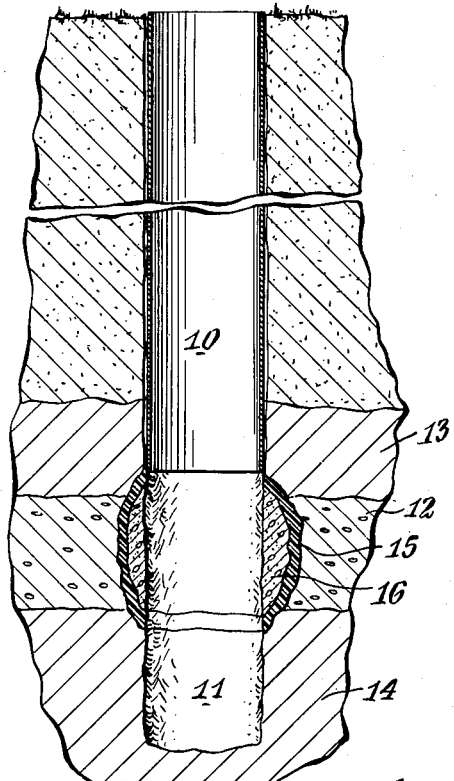
FIG. 1 is a shortened vertical view partly in section and partly in side elevation showing a bore hole wall embodying the invention.

In the practice of this invention, it is possible to produce with compositions (I) novel combinations finding application as sealants for earth formations located over a wide range of depths in such bore holes by choosing a particular hardening agent or combination of hardening agents in particular proportions added to compositions (I) so that each of such combinations is capable of passing through particular temperature zones in said bore holes and still be in pumpable condition at least until it reaches the particular area to be sealed and also is in such condition at that stage that when maintained under certain pressure, a water-containing hardening agent and ketone-aldehyde organic reaction product-rich portion may be squeezed out of the combination into the earth formation to be consolidated and leaving a water and hydraulic cement-rich layer containing some ketone-aldehyde reaction product and hardening agent mass adjacent thereto. Such ketone-aldehyde rich squeeze-out as well as the hydraulic cement-rich layer and also, if present, the combination per se will become converted to the substantially solid and substantially mineral oil and water resistant or insoluble state when maintained at the locale to be sealed under such pressure and temperature there encountered within a period of 24 hours. Due to the presence of said hardening agent therein, the squeeze-out converted into the substantially solid and mineral oil and water resistant or insoluble state is harder, stiffer, denser, more resistant to leaching by the earth's fluids and is more permanent than would the ketone-aldehyde rich squeeze-out of compositions (I) per se in the absence of such hardening agent. Such novel squeeze-outs from such combinations are capable of being converted to the substantially solid state within pre-determined periods of time at certain temperatures. Consequently, the presence of such hardening agents decreases the time necessary for converting the squeeze-outs to the substantially solid and water resistant or insoluble state at certain pre-determined temperatures. Due to the presence of said hardening agents in the squeeze-outs from said novel combinations, said squeeze-outs when converted to the substantially solid and substantially water-insoluble or resistant state at the temperature of the strata to be consolidated or sealed, is a water-containing substantially uniform mass which is a gel or in the nature of a gel and is of a somewhat tough "rubbery" nature and is resilient and capable of withstanding shock, and also has the characteristics of good compression strength, impact and shock resistance which are important attributes in the oil and gas well fields where a sealant is to be subjected to sudden shocks, impacts, etc. many times encountered as a result of pumping vibrations, casing perforation or other operation performed in the course of completion operation.

For example, by practising this invention, it is possible to provide a combination having an acceptable pumping time where the earth formation to be consolidated or sealed is only a few hundred feet from the surface of the earth and the entire combination, as well as the squeeze-out thereof, if any, will both be converted to the substantially solid and substantially water insoluble or resistant state within 24 hours at said location and also to provide another combination for example, having an acceptable pumping time where the earth formation to be consolidated or sealed is 5,000 feet from the surface of the earth and the entire combination and squeeze-out, if any, will be converted to the substantially solid and substantially water resistant or insoluble state within 24 hours at that location and also to provide particular combinations each having an acceptable pumping time and having the foregoing characteristics of the combinations per se, as well as the squeeze-outs, if any, for sealing or consolidating earth formations at any depths, varying from the surface of the earth to 20,000 or more feet from the surface of the earth. In all cases, such combinations, as well as such squeeze-outs therefrom at the various depths of sealing or consolidating earth formations will be converted to the substantially solid and substantially water resistant or insoluble state within a 24 hour period and will have the improved characteristics as before set forth when compared with compositions (I) if employed in the absence of such hardening agent.

Said compositions (I) are produced by mixing together water, hydraulic cement and such ketone-aldehyde reaction products examples of which are said specific products A–JJ, with the ratio by weight of the hydraulic cement to the ketone-aldehyde organic reaction product being 100 parts of the former to 10–100 parts of the latter and the amount of water is also variable depending upon the consistency desired in compositions (I). It is preferable in said compositions (I) that the ratio of hydraulic cement to such ketone-aldehyde reaction products be 100 parts of the former to 20–100 parts of the latter. Specific examples of such compositions (I) are described and illustrated in our copending applications Serial Nos. 350,982 and 658,883 respectively filed on April 24, 1953, and May 13, 1957.

Such hardening agents preferably employed in the practice of this invention are aldehyde-reactive organic reaction products produced by reacting one or a combination of two or more monohydric phenols and preferably hydroxy-benzene and one or a combination of two or more polyhydric phenols and preferably dihydroxy benzene with one or a combination of two or more aldehydes. By the term "aldehyde-reactive" we mean an aldehyde starved product or one capable of reacting with an aldehyde. Said aldehyde-reactive organic product may be produced by reacting a mixture of one or more monohydric phenols and one or more polyhydric phenols with one or more aldehydes; or one or more of the monohydric phenols alone may be reacted with one or more aldehydes; and one or more polyhydric phenols may be reacted with one or more aldehydes and then said organic reaction products may be combined with each other. In either case, and however produced, there is provided an aldehyde-reactive organic reaction product produced by reacting an aldehyde with monohydric phenol and polyhydric phenol. It is preferable that such aldehyde-reactive organic reaction products be such that when reacted with an aldehyde there is produced a thermosetting resin. It is also preferable that such aldehyde-reactive organic reaction product be water soluble or compatible with the ketone-aldehyde organic reaction product employed, and in addition be such that when added to composition (I) to produce the novel combination of this invention, such aldehyde-reactive products are compatible with said ketone-aldehyde reaction products when in said combination or system, that such combinations, as well as the squeeze-outs when converted to such substantially solid state will each characterize as being a water-containing, substantially uniform mass which is substantially solid, substantially water resistant or insoluble and is a gel or in the nature of a gel.

Of course, it is to be understood that such combinations may be prepared by adding to the ketone-aldehyde organic reaction product, some or all of the reactants necessary to produce such aldehyde-reactive organic reaction products. For example, due to the presence of a certain amount of free aldehyde which may be present in the ketone-aldehyde reaction products as prepared commercially, there may be added to the ketone-aldehyde reaction product a water-soluble monohydric phenol-aldehyde organic reaction product together with a certain proportion of a highly reactive polyhydric phenol such as catechol, for example, which in turn reacts with some of the said free aldehyde to produce a water-soluble aldehyde-reactive catechol-aldehyde organic reaction product. Formaldehyde may also be added thereto before or after the catechol addition.

Formaldehyde may also be added before or after the hardening agent is added to composition (I).

In one of its aspects the invention is directed to compositions (I) in combination with an aldehyde-reactive organic reaction product produced by reacting an aldehyde with monohydric phenol and polyhydric phenol, said combination being capable of being filtered under pressure to provide a filtrate which is homogeneous and generally a solution containing water, ketone-aldehyde organic reaction product, aldehyde-reactive organic reaction product and some hydraulic cement-water reaction product, said filtrate having the following characteristic: When maintained in a closed vessel the filtrate contained therein and at a temperature of 180° F. for 24 hours, at the end of that period, the resultant mass is allowed to cool to room temperature and will be found to be substantially uniform, water-containing, substantially solid, substantially water-resistant or insoluble and being a gel or in the nature of a gel. All of the filtrates of all of the specific combinations of this invention have the foregoing characteristics.

A wide variety of such aldehyde-reactive organic reaction products may be employed and may be produced by reacting one or more monohydric phenols and 1 or more polyhydric phenols with varying proportions of aldehyde (and preferably formaldehyde). Because of difficulties encountered due to transportation and storage conditions of time and temperature, it is preferable to employ in the manufacture of such aldehyde-reactive organic reaction products less than 100 and preferably 50–90 moles of aldehyde, preferably formaldehyde, for each 100 moles of the sum of the moles of monohydric phenol and polyhydric phenol as additive or hardening agent for composition (I).

For most purposes, the amount of such aldehyde-reactive organic reaction products employed in the practice of this invention is about 5–90 parts by weight thereof for each 100 parts of said ketone-aldehyde organic reaction product in said composition (I).

The following examples are given merely by way of illustrating some of the procedures which may be followed for the production of some of the aldehyde-reactive organic reaction products and are given by way of illustration and not by way of limitation. All parts as given throughout the present description and claims are by weight unless otherwise specified.

EXAMPLE S-1

(1 mole resorcinol-0.5 mole formaldehyde)

110 parts of resorcinol
40.5 parts of aqueous solution formaldehyde (37% conc.)

were mixed together and warmed for reaction. After reaction was complete the mass was cooled and adjusted to provide an aqueous solution of such organic reaction product to 55% "solids" or concentration. Said aqueous solution is hereinafter known as solution 1 or S–1.

EXAMPLE S-2

(1 mole phenol-0.9 mole formaldehyde)

90 parts of hydroxy benzene
73 parts of aqueous solution formaldehyde (37% conc.)
10 parts of 10% aqueous solution of NaOH were mixed together and heated to approximately 80° C. for reaction and then maintained at 100° C. for ½ hour and subsequently cooled and the resultant reaction mass adjusted to provide an aqueous solution of such organic reaction product to 55% "solids" or concentration. Said aqueous solution is hereinafter known as S–2.

EXAMPLE HS-1

100 parts of S–1 and 100 parts of S–2 were mixed together to provide a solution hereinafter known as HS–1.

EXAMPLE HS-2

80 parts of S–1 and 20 parts of S–2 were mixed together to provide a solution hereinafter known as HS–2.

EXAMPLE HS-3

20 parts of S–1 and 80 parts of S–2 were mixed together to provide a solution hereinafter known as HS–3.

EXAMPLES HS-4, -5 and -6

276 parts phenol, 440 parts of a polyhydric phenol, which may be catechol, hydroquinone or resorcinol and 1.6 parts of 28% hydrochloric acid are heated at about 215° F. until all the polyhydric phenol is dissolved. Then 268 parts of an aqueous solution of formaldehyde (37% conc.) is slowly added thereto with agitation at such a rate that the temperature of the reaction mixture does not go over 225° F. After all the formaldehyde is added, the reaction mixture is heated to 250° F. and then cooled to room temperature. The excess HCl is neutralized by adding thereto an aqueous solution consisting of 11.8 parts of sodium hydroxide dissolved in 11.8 parts of water and this entire aqueous mass is hereinafter known as HS–4, consisting essentially of an aqueous solution of phenol-catechol-formaldehyde organic reaction product; HS–5 consisting essentially of an aqueous solution of phenol-hydroquinone-formaldehyde organic reaction product; or HS–6 consisting essentially of an aqueous solution of phenol-resorcinol-formaldehyde organic reaction product.

EXAMPLE HS-7

Employing the same procedure as that set forth in Examples HS–4–6 and using a combination of 400 parts of resorcinol and 20 parts of catechol in place of the 440 parts of designated polyhydric phenol, there is produced an aqueous solution hereinafter known as HS–7.

EXAMPLE HS-8

Employing the same procedure as that set forth in Examples HS–4–6 and using a combination of 380 parts of resorcinol and 70 parts of hydroquinone in place of the 440 parts of designated polyhydric phenol, there is produced an aqueous solution hereinafter known as HS–8.

EXAMPLE HS-9

Employing the same procedure as that set forth in Examples HS–4–6 and using a combination of 350 parts of resorcinol, 20 parts of catechol, 40 parts of hydroquinone in place of the 440 parts of designated polyhydric phenol, there is produced an aqueous solution hereinafter known as HS–9.

All of said solutions of hardening agents, examples of which are HS–1 to HS–9 are aqueous solutions of mixed phenols-formaldehyde organic reaction products with one of the phenols being monohydric phenol and another phenol being polyhydric phenol. Said organic reaction products are aldehyde-reactive, water soluble and are capable of being reacted with formaldehyde to provide a thermosetting resin. In addition, such modifiers are compatible with aqueous solutions of said ketone-aldehyde organic reaction products, and when in combination with compositions (I), such aldehyde reactive organic reaction products serve to impart to the said combinations and squeeze-outs thereof the improved characteristics and properties heretofore set forth.

The following are illustrations of combinations embodying the present invention and are given by way of illustration and not limitation.

GENERAL EXAMPLE

Into a mixing vessel suitable for use in the preparation of cement slurries is charged the requisite amount of (I) water to provide an ultimate slurry of the desired viscosity and generally of 1-10 poises at 80° F., (II) one or a combination of two or more of said ketone-aldehyde organic reaction products examples of which are products A-JJ, and (III) one or a combination of two or more of said hardeners, examples of which are hardeners in solution and known as HS-1 to 9, with the ratio by weight of (II) to (III) being in the ratio range of 100 parts of (II) to 5-40 parts of (III). And, if desired, there may be added thereto, 5-30 parts of (IV) an aqueous solution of formaldehyde (37% conc.) for each 100 parts of (II). In any case, with or without (IV), the components are stirred together after each addition to provide an aqueous solution. In general the component (II) is added to (I) in an aqueous solution.

After said solution of (I), (II) and (III) with or without (IV) is obtained, to the solution while being maintained at about 80° F. and while being stirred, there is slowly added (V) one or a combination of two or more hydraulic cements to provide a smooth slurry, substantially free of lumps and being substantially uniform throughout and of substantially uniform consistency. The ratio by weight of (V) to (II) is in the ratio range of 10 parts of (V) to 1-10 parts of (II).

The time required for preparing said slurry was about 7 minutes and the slurry is now ready for use and should be used immediately.

If desired, the cement, water and ketone-aldehyde resin may be first mixed together and then there may be added thereto the desired hardener, with or without formaldehyde.

EXAMPLE 1

Into a mixing device suitable for use in the preparation of cement slurries are charged 132 parts of water, 308 parts of an aqueous solution of product D (80% conc.) and 30.8 parts of HS-6. These components are stirred to provide a substantially uniform mass or solution. Then, while being constantly stirred there is slowly added thereto 440 parts of Portland cement (A.S.T.M. Designation C-150 Type I Cement) to provide a smooth slurry hereinafter known as slurry 1 which is substantially uniform and of substantially uniform consistency throughout. Throughout the entire mixing operation the temperature of the mix is maintained at about 80° F. The slurry 1 was prepared in about 7 minutes and is ready for use and should be used immediately.

EXAMPLE 2

Following the same procedure as that set forth in Example 1 and using the same components in the amounts set forth therein except that for the 30.8 parts of HS-6 there is employed 28 parts of HS-5 and 1 part of resorcinol, there was provided slurry 2 which is substantially uniform throughout and of substantially uniform consistency.

EXAMPLES 3, 4 AND 5

Following the same procedure as that set forth in Example 1 and using the same components in the amounts set forth therein except that 50, 20 and 70 parts respectively of HS-1, HS-2 and HS-3 respectively are employed in place of HS-6, there were provided slurries 3, 4 and 5 respectively which were substantially uniform throughout and of substantially uniform consistency.

EXAMPLES 6 TO 9

Following the same procedure as that set forth in Example 1 and using the same compounds in the amounts therein set forth except that 27, 31, 25 and 22 parts respectively of HS-4, HS-7 to HS-9 respectively are employed in place of HS-6, there were produced slurries 6-9 respectively which were substantially uniform throughout and of substantially uniform consistency.

EXAMPLES 10-18

Following the same procedure as that set forth in Examples 1-9 and using the same components in the amounts set forth therein except that 5 parts of an aqueous solution of formaldehyde (37% conc.) was charged into the mixing device together with the other components and before the addition of the Portland cement, there are provided slurries 10-18 respectively all of which also are substantially uniform throughout and of substantially uniform consistency.

All of the slurries which are prepared according to said General Example, and specific illustrative examples of which are slurries 1-18 are smooth and have a viscosity at 80° F. no greater than 10 poises, and are pumpable slurries finding application in the field of sealing earth formations.

Various other specific slurries are produced by employing the same procedure as that set forth in Examples 1-18 and using the same components in the amounts set forth therein except that all or part of the aqueous solution of Product D may be replaced by a corresponding amount of an 80% aqueous solution of any other ketone-aldehyde reaction product and specifically products A-C and E-JJ respectively.

Employing slurry 1 as a test material, the following tests were conducted and results recorded.

Test I

Immediately after making the slurry 1, a portion thereof was heated to increase the temperature thereof from 80° F. and at the rate of 1° per minute over a 45 minute period to 125° F. and the viscosity of the mass was determined and recorded at various intervals. After reaching 125° F. the mass was maintained at said temperature until the viscosity of the mass at that temperature was 40 poises. The following table discloses the various viscosity readings at various temperatures and times. Throughout this test the mass was constantly stirred employing the Halliburton Consistometer as the testing device.

TABLE

| Time (minutes) | 0 | 20 | 45 | 60 | 80 | 120 | 140 |
|---|---|---|---|---|---|---|---|
| Temp., °F | 80 | 100 | 125 | 125 | 125 | 125 | 125 |
| Viscosity (poises) | 2 | 2 | 3 | 3 | 6 | 16 | 40 |

Test II

A quantity of slurry 1 at a temperature of 80° F. was placed in the Halliburton Consistometer and the mass while therein was heated to increase the temperature thereof approximately 1° F. per minute. The heating was continued for 15 minutes at which time the temperature of the slurry had increased to 95° F. The material was then immediately transferred to a filter press and was subjected therein to a pressure of 100 lbs. per sq. in. whereupon a filtrate was separated and collected over a period of approximately 15 minutes and was characterized by being an amber colored substantially clear liquid. The filtrate was then placed into a 125° F. constant temperature bath and permitted to remain therein for 24 hours. Then the mass was removed from the bath and found to be a substantially solid, substantially water insoluble, water-containing, substantially homogeneous or uniform composition which was of a resilient nature and may be further characterized as being a tough, dense, resilient, compact mass which appeared to be a gel or in the nature of a gel. For testing the penetration of said substantially solid material, there was employed a Vicat apparatus, as shown in ASTM Standards on Cement, sponsored by ASTM Committee C-1 on Cement, published by ASTM (Oct. 1955) with special reference to chapter entitled ASTM Designation C-191-52.

Following the general method of and employing such Vicat apparatus, said substantially solid material was tested and found to have a penetration of 15 mm. at the end of 30 seconds at 25° C., which is much less than maximum allowable penetration for sealants in the oil fields.

*Test III*

A quantity of slurry 1 was charged into the Halliburton Consistometer and was heated therein to raise the temperature at the rate of 1° F. per minute from 80° F. to 125° F. in 45 minutes and was held at this temperature for an additional 15 minutes. At the end of this time the slurry 1 was placed in a filter press and was subjected to 100 lbs. per sq. in. pressure and a filtrate was separated and collected. The filtrate was a substantially clear, amber colored liquid. The filtrate was placed in a constant temperature bath at 125° F. for 24 hours. At the end of that period it was found to be a substantially solid, substantially water-insoluble, water-containing substantially homogeneous or uniform composition of a resilient nature which may be further characterized as being a tough, dense, compact mass which appeared to be a gel or in the nature of a gel. This mass, when tested in the manner heretofore set forth using the Vicat apparatus, was found to have a penetration of 7 mm. in 30 seconds at 25° C. which also is significantly below the maximum allowable penetration for sealants in the oil field.

*Test IV*

A quantity of slurry 2 was charged into the Halliburton Consistometer and was heated therein at the rate of 1° F. per minute from 80° F. to 125° F. in 45 minutes. The slurry 2 was then held at this temperature of 125° F. for an additional 75 minutes. At the end of this time the slurry 2 was transferred to a filter press and subjected to a pressure of 100 lbs. per sq. in. A filtrate was separated and collected which was a substantially clear amber colored liquid. The filtrate was separated and collected as a substantially clear amber colored liquid. The filtrate was then placed in a constant temperature bath at 125° F. for 24 hours at the end of which period it was found to be a substantially solid, water-insoluble, water-containing substantially homogeneous or uniform composition of a resilient nature which may be further characterized as being a tough, dense and compact mass appearing to be a gel or in the nature of a gel. This mass, when tested in the manner heretofore set forth using the Vicat apparatus, was found to have a penetration of 3 mm. in 30 seconds at 25° C., greatly below the maximum permissible value for sealants in the oil field.

*Test V*

A pair of molds 2″ x 2″ x 2″ were filled with a sample of slurry 1 and then placed in a constant temperature bath of 125° F. After 24 hours, one of the molds containing the original slurry 1 was removed from the bath and upon examination the original slurry 1 was found to be converted to the substantially solid state and now was removed from the mold and its compression strength was tested by placing it between a pair of platens of an hydraulic press and pressure applied until crumbling occurred. The compression strength of the solid was found to be 1100 lbs. per sq. in. The sample in the other mold was removed from the bath at the end of 48 hours and it also was solid at that time and was also tested for compression strength which was determined to be 1400 lbs. per sq. in.

In the course of said compression tests, it was observed that as the pressure on the test pieces increased, the test pieces deformed and the thickness thereof became progressively reduced until it measured about 1.5″, a decrease in thickness of about 0.5″ and when the ultimate respective pressures above set forth were reached, cracking and crumbling occurred.

The results of the foregoing tests clearly show that the combinations of the present invention are eminently suitable for sealing, plugging and/or consolidating earth structures and are especially suitable for sealing of earth bore walls in the oil and natural gas and other fields where it is desired to seal or plug the walls of subsurface borings and tunnels and render such walls impervious or less pervious to the flow of earth fluids therethrough.

The following table discloses various formulations which may be employed and having pumping times of 140 minutes under the temperature conditions indicated:

|  | 80°–100° F., parts | 80°–120° F., parts | 80°–130° F., parts |
| --- | --- | --- | --- |
| Water | 132 | 132 | 132 |
| Portland Cement (of Example 1) | 440 | 440 | 400 |
| 80% aqueous solution of Product D | 308 | 308 | 308 |
| HS-6 | 52 | 32 |  |
| HS-3 |  |  | 25 |

Also according to this invention, the novel combinations may be used in the manner given merely by way of illustration and not limitation to show a method of application.

In a case where during the drilling operation of an oil or gas well as shown in FIG. 1, there is a casing 10 extending partially into the bore hold. In the particular formation shown in FIG. 1, for the purposes of illustration, that part 11 of the bore hold below the casing 10 extends through a water bearing opening or stratum 12 between a pair of impervious strata 13 and 14. Because water from the opening or stratum 12 flows into the bore hole, for obvious reasons it becomes necessary to seal or plug the opening or stratum 12 to reduce and more preferably to prevent completely the flow of water therefrom into the bore hole.

Also according to this invention, the aforesaid results may be attained by employing the various combinations of this invention, examples of which are slurries 1–18. The slurry 1, for example, is pumped through the casing 10 to fill the part 11 of the bore hole and until its level is well up into the lower end of casing 10 whereby some of the slurry 1 is located in the space between the outside of the lower end of the casing 10 and the bore hold wall adjacent thereto. Then while the slurry 1 is subjected to super-atmospheric pressure whereby more of the slurry extends further up outside of the casing while that in part 11 has some of the water, ketone-aldehyde and HS–6 thereof forced or "squeezed out" of the slurry to provide an outer layer 15 rich in the ketone-aldehyde component, with the inner part 16 now being richer in the Portland cement component. The ketone-aldehyde rich outer layer 15 containing HS–6 and water, extends into the hole or water bearing stratum and together with the Portland cement rich inner part seals or plugs stratum or opening 12. The pressure is maintained for the required period of time and after the layers 15 and 16 have become set or hardened within 24 hours to seal or plug stratum 12, a drilling tool is lowered through casing 10 and the bulk of the mass of hardened or set slurry in part 11 and rich in Portland cement is drilled through, leaving the bore hold wall as shown in FIG. 1 with the stratum or hole 12 substantially completely sealed or plugged by the ketone-aldehyde rich inner covering or layer 15 now in the substantially solid state and contiguous with the hardened or set Portland cement rich layer 16. The layer 15 is further characterized as being a substantially uniform water-containing mass, substantially water insoluble and infusible at 300° F. and is a gel or in the nature of a gel. Drilling may be continued through the lower impervious layer if desired.

Figure 2:
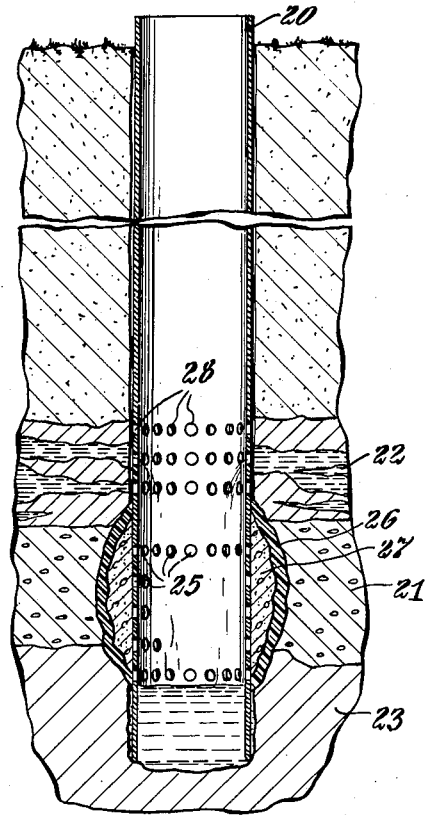
FIG. 2 is a shortened vertical view in section showing a bore hole wall embodying the invention.

In another case in the oil or gas well field, there is a casing 20 in the earth bore hole. In the particular formation shown in FIG. 2, for the purposes of illustration, the casing 20 extends through a water bearing stratum or opening 21 between an upper oil and gas bearing stratum 22 and a lower impervious stratum 23. Because water from stratum 21 enters the casing 20, it becomes necessary to seal it off if possible. The casing may be shot at its lower end in the manner known to the art to provide openings 25 therethrough which are adjacent the water bearing strata. Like before, a slurry such as slurry 1, for example, is pumped into the lower part of the casing 20 and under pressure through the holes 25 and into the space between the outer side of the casing and the stratum 21 and into stratum 31 and maintained under pressure for a sufficient time and generally up to 24 hours. After setting, like in FIG. 1, there will be a seal or plug of a ketone-aldehyde rich outer layer 26 which is now solidified like layer 15 and an outer layer of set or hardened Portland cement rich layer 27 like layer 16. If desired, the hardened slurry within the casing 20 may be drilled out. Then the casing 20 is shot through to provide openings 28 around the oil and gas bearing stratum 22, and now with stratum 21 sealed off, the well produces oil and gas without large quantities of water from stratum 21.

Figure 3:
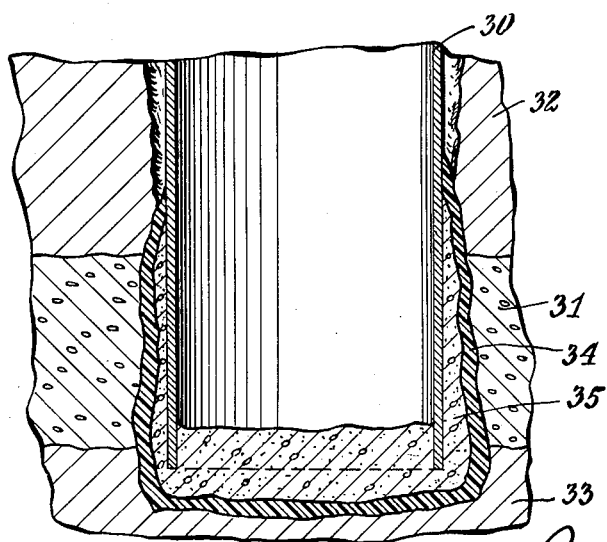
FIG. 3 is a shortened vertical view in section showing a bore hole wall embodying the invention.

In the case shown in FIG. 3, there is a casing 30 in the bore hole with the lower end thereof through a pervious or water bearing stratum 31 between a pair of impervious strata 32 and 33. In order to seal off the stratum 31 like before, slurry 1 is pumped through the casing 31 to a level above the lower extremity thereof and is under pressure to drive the slurry upwardly in the space between the casing and the stratum 31 and the organic reaction product components are squeezed outwardly to provide an HS–6 containing ketone-aldehyde rich outer layer 34 and a Portland cement rich inner layer 35. The pressure is maintained for the desired period of time, that is, up to about 24 hours. After setting, like in FIG. 1, there will be a plug or seal of ketone-aldehyde rich inner layer which is now solidfied and is like 15 and an outer layer of set or hardened Portland cement rich outer layer 35, like layer 16, blocking off or sealing the stratum 31, and also plugging the end of the casing. If it is desired to extend the bore hole, all that need be done is to drill through the plug hardened at the end of the casing and the remainder of the hardened mass between the casing and the stratum 31 will remain to effectively plug or seal that stratum.

Figure 4:
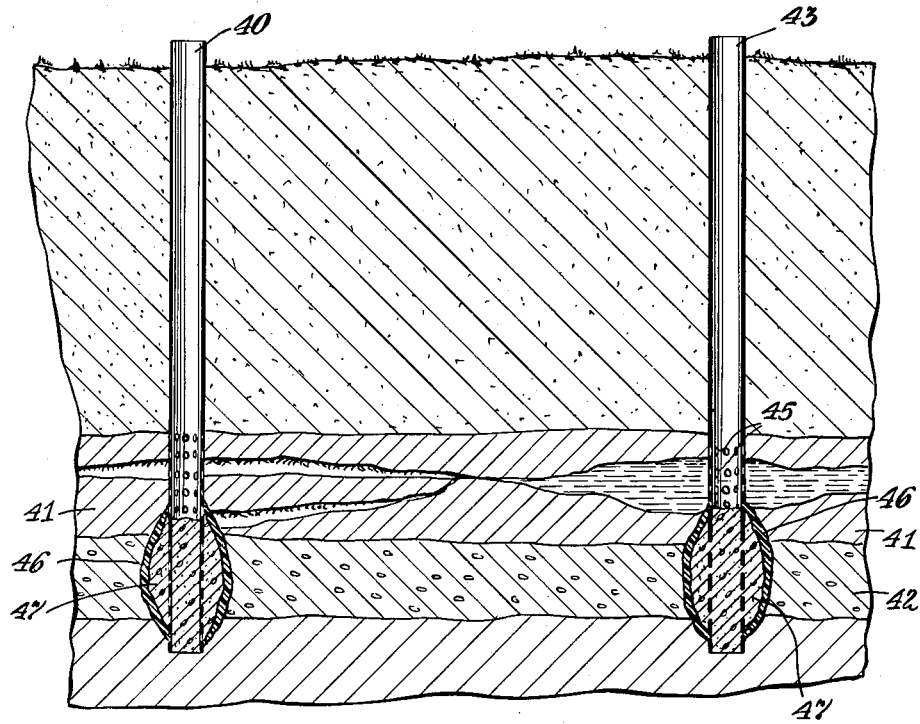
FIG. 4 is a shortened vertical view of bore hole wall embodying the invention.

In still another case in the oil field, there may be a dry well with a casing 40 as shown in FIG. 4. The lower end of the casing 40 extends through adjacent layers or strata 41 and 42, with the layer 41 being oil bearing while the stratum 42 is highly pervious and may or may not be loaded with water. Another bore hole may be drilled a considerable distance from casing 40 and there may be located therein a pipe or casing 43 the lower end of which has holes 45 therethrough as does the lower end of casing 40. Fluid, such as water, under pressure is forced into casing 43 with the purpose of forcing the oil out of stratum 41 into casing 40. Because the stratum 42 is pervious, the water under pressure follows the path of least resistance and therefore the fluid forced into casing 40 would be mostly water. Therefore it is necessary to remedy that condition and for this purpose, a slurry such as slurry 1 is pumped into the lower end of each of the casings 40 and 43 to fill the lower parts and to be forced through the casing openings into the stratum 42 and, as before, is maintained under pressure until set and hardened. And, like in FIG. 1, there is an outer layer 46 rich in ketone-aldehyde which has been set and an inner Portland cement rich layer 47 which has been hardened and set. Now with fluid under pressure in casing 43, the fluid is blocked off from the new sealed pervious layer 42 and its pressure is exerted on the oil in the stratum 41 to force it into and up through casing 40.

Figure 5:
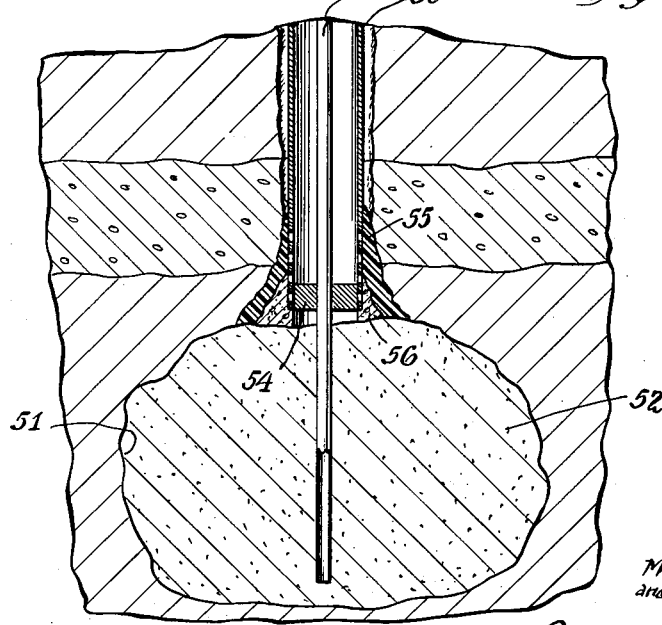
FIG. 5 is a shortened vertical view showing a bore hole wall, with the casing sealed to the bore hole wall and embodying the invention.

In still another case in the oil or gas well field, there may be a dry well or a well of salt deposit with a casing 50 extending through the earth into well 51 filled with salt 32 as shown in FIG. 5. In this case the object might be to dissolve and flush out the salt so that the well could be employed as a natural storage tank for gasses and the like. In order that the well may be employed for this purpose, it might be necessary to seal the lower end of the casing to the outlet mouth of the well to prevent the escape of gasses, for example, which may be forced into the well. This may be accomplished by plugging the lower end of the casing 50 with a plug 54 and the holes are shot through the lower end of the casing. A slurry such as slurry 1 is pumped down into the casing 50 and forced out through the shot holes therein into the space between the lower end of the casing and the mouth of the well. Ordinarily the salt level is close to the lower extremity of the casing. The slurry thus becomes applied to the earth bore structure and is maintained under pressure whereupon it is driven upwardly in the space between the casing 50 and the earth therearound at the lower part of the well and the reaction products components are squeezed outwardly to provide an HS–6 containing ketone-aldehyde rich outer layer 55 and a Portland cement rich inner layer 56. This pressure is maintained for the desired period of time and after setting, like in FIG. 1, there will be a plug or seal of ketone-aldehyde rich outer layer which is now solidified and a set or hardened Portland cement rich inner layer. Then that portion of the slurry which has become hardened and is located in the bottom of the casing, is drilled out as well as the plug so that there may now be extended through the length of the casing, a pipe 57 through which water may be admitted to the salt to dissolve it and the salt solution is forced upwardly through the casing 50. In this illustrative example, it is apparent that there is provided a seal between the lower end of the casing and the mouth of the well and this seal prevents the escape of gas which is admitted into the storage chamber 51 after the salt has been removed therefrom in the manner heretofore set forth.

Of course, it is understood that various other slurries may be used instead of that known as slurry 1; any of the other ketone-aldehyde reaction products, examples of which are products A–C and E–JJ, may be substituted for product D in slurry 1. Also, the ratio of Portland cement or other hydraulic cement to the ketone-aldehyde reaction product may be varied over very wide limits as may be the quantity of water used. Also, other such aldehyde-reactive organic reaction products, examples of solutions thereof being HS–1 to HS–5 and HS–7 to HS–9, may be substituted for the HS–6 and the ratio of such aldehyde-reactive organic reaction products to the ketone-aldehyde may be varied to provide other slurries having acceptable pumping times and whose ketone-aldehyde rich layers such as 15, 26, 34, 46 and 55, as well as the hydraulic cement rich layers 16, 27, 35, 47 and 56 will become set under the conditions at the sealing locale within 24 hours. Also there may be substituted other inorganic alkaline material in place of the Portland cement. When no Portland cement is used, the quantity of calcium hydroxide employed may be 2% or more by weight of the ketone-aldehyde in solution or slurry or such chemical equivalent of the calcium hydroxide may be used.

Also one or more additives may be employed together with the straight alkaline solution or slurry of the ketone-aldehyde reaction products together with the aldehyde-reactive organic reaction product or with the hydraulic cement, water, ketone-aldehyde and aldehyde-reactive reaction products, for various purposes, for example, to control the setting time of the mass, to control the nature or characteristics of the mass when set or for a variety of other reasons. Other materials usable with the ketone-aldehyde organic reaction products and adapted to serve as catalysts or setting agents together with or in place of the alkaline clays (bentonite, etc.), plaster of Paris and Portland cement are water soluble amines (aniline), triethylamine and similar amines; sodium, potassium and ammonium caseinates, animal glue, blood albumen, egg albumen, lime, soda ash, potash and other water soluble alkaline materials. Some other substances which may be employed as additives are formaldehyde reaction products of other ketones, such as methyl ethyl ketone, mesityl oxide, isopropyl methyl ketone, furfuralketone reaction products, furfuryl alcohol, furfuryl alcohol-formaldehyde reaction products, partially hydrogenated furfural-ketone reaction products in which the degree of hydrogenation is 15%–65% of the amount of hydrogen required to saturate all carbon to carbon double bonds, also said polymers of said partially hydrogenated furfural-ketone reaction products, alkyd resins, polyester resins, epon resins and phenolic resins, such as the phenol-aldehyde resins, cashew liquid derivatives and urea resins.

It is also within the purview of this invention to substitute the ketone-aldehyde resins herein entirely or in part for the resin component of other known compositions and especially those also containing an hydraulic cement and used to treat the bore hole wall structure for the purposes hereinbefore set forth.

Besides being useful to treat bore hole structures, said compositions of hydraulic cement, water and ketone-aldehyde are also useful for the production of ceramic pipes and conduits, roadways, sidewalks, tank linings and other protective surfaces.

Also in the treatment of an earth bore wall, it may not always be required to have the slurry, such as slurry 1, under such pressure as to squeeze out the ketone-aldehyde rich layer as shown in the drawings and as described herein. These illustrations are set forth merely to show type of combination of aldehyde-reactive organic reaction product together with water, hydraulic cement, ketone-aldehyde reaction product. In some cases the combination may be put in place and, without any appreciable squeezing out of any of the reaction products, is allowed to set to the substantially solid set state, with the hydraulic cement, aldehyde-reactive organic reaction product and ketone-aldehyde solidified en masse and set, and being substantially uniformly distributed with respect to each other.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to our novel composition of matter herein claimed without departing from the spirit of the invention. Particularly it is to be understood that in said claims, ingredients or components recited in the singular are intended to include compatible mixtures of said ingredients wherever the sense permits.

This application is a continuation in part of our copending application Serial No. 658,883 filed May 13, 1957 which in turn is a continuation in part of our copending application Serial No. 350,982 filed on April 24, 1953, which in turn is a continuation in part of our application Ser. No. 122,852 filed October 21, 1949 and now abandoned, which in turn was a continuation in part of our application Ser. No. 99,114 filed June 14, 1949 and issued as Patent No. 2,683,133 on July 6, 1954 and also is a continuation in part of our copending applications Ser. No. 492,052 filed March 3, 1955 and 612,932 filed October 1, 1956. All of said applications are hereby made part hereof.

Having thus described the invention, what is claimed is:

1. A composition of matter containing hydraulic cement, water, and normally water-soluble ketone-aldehyde organic reaction product in combination with normally water-soluble aldehyde-reactive organic reaction product of aldehyde reacted with monohydric phenol and polyhydric phenol, said aldehyde-reactive organic reaction product being capable of being reacted with an aldehyde to produce a thermosetting resin.

2. A composition of matter containing water-soluble ketone-aldehyde organic reaction product, hydraulic cement and water in combination with aldehyde-reactive normally water-soluble organic reaction product produced by reacting monohydric phenol and dihydric phenol with aldehyde, with the ratio by weight of said monohydric phenol to said polyhydric phenol being in the range of 100 parts of monohydric phenol to 25–400 parts of polyhydric phenol, said aldehyde-reactive organic reaction product being capable of being reacted with an aldehyde to produce a thermosetting resin.

3. A composition of matter containing water-soluble ketone-formaldehyde organic reaction product, hydraulic cement and water in combination with an aldehyde-reactive normally water-soluble organic reaction product produced by reacting monohydric phenol and polyhydric phenol with formaldehyde with the ratio by weight of said monohydric phenol to said polyhydric phenol being in the range of 100 parts of monohydric phenol to 25–400 parts of polyhydric phenol and the ratio of the moles of formaldehyde to the sum of the moles of said monohydric phenol and said polyhydric phenol being approximately 50–90 moles of formaldehyde to 100 moles of said sum of monohydric phenol and polyhydric phenol, said aldehyde-reactive organic reaction product being capable of being reacted with an aldehyde to produce a thermosetting resin.

4. A composition of matter containing water-soluble ketone-formaldehyde organic reaction product, hydraulic cement and water in combination with aldehyde-reactive normally water-soluble organic reaction product produced by reacting monohydric phenol and polyhydric phenol with formaldehyde with the ratio by weight of said monohydric phenol to said polyhydric phenol being in the range of 100 parts of monohydric phenol to 25–400 parts of polyhydric phenol, the ratio by weight of said ketone-formaldehyde organic reaction product to said aldehyde-reactive organic reaction product being in the range of 100 parts of the former to 5–40 parts of the latter, said aldehyde-reactive organic reaction product being capable of being reacted with an aldehyde to produce a thermosetting resin.

5. A composition of matter containing hydraulic cement, water and normally water-soluble acetone-formaldehyde organic reaction product in combination with aldehyde-reactive normally water-soluble organic reaction product produced by reacting formaldehyde with monohydric phenol and polyhydric phenol, said aldehyde-reactive organic reaction product being capable of being reacted with an aldehyde to produce a thermosetting resin.

6. A composition of matter containing hydraulic cement, water and normally water-soluble acetone-formaldehyde organic reaction product in combination with aldehyde-reactive normally water-soluble organic reaction product produced by reacting formaldehyde with monohydric phenol and polyhydric phenol, the ratio of the moles of formaldehyde to the sum of the moles of said monohydric phenol and said polyhydric phenol being approximately 50–90 moles of formaldehyde to 100 moles of said sum of monohydric phenol and polyhydric phenol, said aldehyde-reactive organic reaction product being capable of being reacted with an aldehyde to produce a thermosetting resin.

7. A composition of matter containing hydraulic cement, water and normally water-soluble acetone-formaldehyde organic reaction product in combination with aldehyde-reactive normally water-soluble organic reaction product produced by reacting formaldehyde with monohydric and polyhydric phenols, said combination capable of being filtered to provide a substantially homogeneous filtrate containing said organic reaction products and water, said aldehyde-reactive organic reaction product being capable of being reacted with an aldehyde to produce a thermosetting resin.

8. A composition of matter containing hydraulic cement, water and acetone-formaldehyde organic reaction product in combination with aldehyde-reactive, normally water-soluble organic reaction product produced by reacting formaldehyde with monohydric and polyhydric phenols, said combination capable of being filtered to provide a substantially homogeneous filtrate containing said organic reaction products and water, said filtrate capable when maintained at a temperature of 180° F. in a closed vessel for 24 hours, at the end of the period the mass will be found to be substantially uniform, water-containing and substantially solid, said aldehyde-reactive organic reaction product being capable of being reacted with an aldehyde to produce a thermosetting resin.

9. A novel composition comprising hydraulic cement, water, water-soluble ketone-aldehyde reaction product in combination with aldehyde-reactive composition, said combination capable of being filtered under pressure to provide a filtrate, said filtrate capable of being converted at elevated temperature into a substantially uniform water-containing mass which is substantially water-resistant and substantially solid, said aldehyde-reactive composition containing aldehyde-reactive organic reaction product of aldehyde reacted with monohydric phenol and polyhydric phenol, and aldehyde-reactive, normally water-soluble organic reaction product capable of imparting hardness to said filtrate when said filtrate is converted to said substantially solid state, said ketone-aldehyde reaction product being further characterized as follows: when a 100-gram solution consisting of an 80-gram sample thereof and 20 grams of water is mixed with 10 grams of lime and such mixture is placed in an oven maintained at 130° F. and allowed to remain therein for 24 hours, at the end of that period the mass will be found to be substantially solid and substantially water-resistant, said aldehyde-reactive organic reaction product being capable of being reacted with an aldehyde to produce a thermosetting resin.

10. An earth bore wall structure, a portion thereof comprising a combination of hydraulic cement, ketone-aldehyde organic reaction product and aldehyde-reactive, normally water-soluble organic reaction product in the substantially solid state, said aldehyde-reactive product produced by reacting aldehyde with monohydric phenol and polyhydric phenol, said aldehyde-reactive organic reaction product being capable of being reacted with an aldehyde to produce a thermosetting resin.

11. An earth bore wall structure, a portion thereof comprising a combination of Portland cement, ketone-formaldehyde organic reaction product and aldehyde-reactive, normally water-soluble organic reaction product in the substantially solid state, said aldehyde-reactive product produced by reacting aldehyde with monohydric phenol and polyhydric phenol, said aldehyde-reactive organic reaction product being capable of being reacted with an aldehyde to produce a thermosetting resin.

12. The method comprising treating an earth bore wall structure with a slurry containing Portland cement and acetone-formaldehyde organic reaction product, and aldehyde reactive, normally water-soluble organic reaction product produced by reacting monohydric phenol and polyhydric phenol with formaldehyde, said aldehyde-reactive organic reaction product being capable of being reacted with an aldehyde to produce a thermosetting resin.

13. The method of sealing earth formation which comprises forcing thereagainst a slurry comprising water, hydraulic cement, ketone-aldehyde, normally water-soluble organic reaction product and aldehyde-reactive product produced by reacting aldehyde with monohydric phenol and polyhydric phenol whereby at least some of said organic reaction products are forced out of slurry and into said formation and cured in said formation thereby forming a sheath adjacent said hydraulic cement, said aldehyde-reactive organic reaction product being capable of being reacted with an aldehyde to produce a thermosetting resin.

14. The method of sealing earth formation which comprises forcing thereagainst a slurry comprising water, Portland cement, ketone-formaldehyde organic reaction product and aldehyde-reactive, normally water soluble organic reaction product produced by reacting formaldehyde with monohydric phenol and polyhydric phenol whereby some of said reaction products and water are forced out of said slurry and into said formation and cured in said formation thereby forming a sheath adjacent said Portland cement, said aldehyde-reactive organic reaction product being capable of being reacted with an aldehyde to produce a thermosetting resin.

15. An earth bore wall structure in a permeable formation, having an inner portion comprising a set hydraulic cement containing a cured ketone-aldehyde organic reaction product and aldehyde-reactive, normally water-soluble product of monohydric phenol and polyhydric phenol and an outer layer of cured ketone-aldehyde organic reaction product and aldehyde-reactive reaction product of formaldehyde with monohydric phenol and polyhydric phenol said outer layer being adjacent and contiguous with said inner portion, said aldehyde-reactive organic reaction product being capable of being reacted with an aldehyde to produce a thermosetting resin.

16. An earth bore wall structure in a permeable formation, having an inner portion comprising a set Portland cement containing a cured ketone-formaldehyde organic reaction product and aldehyde-reactive, normally water-soluble reaction product of monohydric phenol and polyhydric phenol and an outer layer of said cured ketone-formaldehyde organic reaction product and aldehyde-reactive reaction product of formaldehyde with monohydric phenol and polyhydric phenol said outer layer being adjacent and contiguous with said inner portion, said aldehyde-reactive organic reaction product being capable of being reacted with an aldehyde to produce a thermosetting resin.

17. A composition of matter containing hydraulic cement, water, normally water-soluble ketone-formaldehyde organic reaction product in combination with aldehyde-reactive, normally water-soluble organic reaction product produced by reacting formaldehyde with monohydric phenol and polyhydric phenol, said aldehyde-reactive organic reaction product being capable of being reacted with an aldehyde to produce a thermosetting resin.

18. A composition of matter containing hydraulic cement, water and mixed normally water-soluble ketones-formaldehyde organic reaction product in combination with aldehyde-reactive, normally water-soluble organic reaction product produced by reacting formaldehyde with monohydric phenol and polyhydric phenol, one of said ketones being acetone, said aldehyde-reactive organic reaction product being capable of being reacted with an aldehyde to produce a thermosetting resin.

19. A composition of matter as defined in claim 3, with the ratio by weight of said ketone-formaldehyde organic reaction product to said aldehyde-reactive organic reaction product being in the range of 100 parts of the former to 5–40 parts of the latter.

20. A composition of matter containing (a) water-soluble ketone-formaldehyde organic reaction product, (b) hydraulic cement and (c) water, in combination with (d) formaldehyde and (e) aldehyde-reactive, normally water-soluble organic reaction product produced by reacting monohydric phenol and polyhydric phenol with formaldehyde with the ratio by weight of said monohydric phenol to said polyhydric phenol being in the range of 100 parts of monohydric phenol to 25–400 parts of polyhydric phenol and the ratio of the moles of formaldehyde to the sum of the moles of said monohydric phenol and said polyhydric phenol being approximately 50–90 moles of formaldehyde to 100 moles of said sum of monohydric phenol and polyhydric phenol, said aldehyde-reactive organic reaction product being capable of being reacted with an aldehyde to produce a thermosetting resin, the ratio by weight of said (a) to said (e) being in the range of 100 parts of (a) to 5–40 parts of (e), and with the ratio by weight of said (a) to said (d) being in the range of 100 parts of (a) to 2.15–14.18 parts of (d).

References Cited in the file of this patent
UNITED STATES PATENTS

| | | |
|---|---|---|
| 2,485,527 | Cardwell | Oct. 18, 1949 |
| 2,492,212 | Dailey | Dec. 27, 1949 |
| 2,674,322 | Cardwell | Apr. 6, 1954 |
| 2,675,881 | Cardwell | Apr. 20, 1954 |
| 2,819,239 | Eberhard et al. | Jan. 7, 1958 |
| 2,828,820 | Harvey et al. | Apr. 1, 1958 |